(12) United States Patent
Hedlund et al.

(10) Patent No.: US 10,655,545 B2
(45) Date of Patent: May 19, 2020

(54) THROTTLE ACTUATOR POSITION VERIFICATION

(71) Applicant: Polaris Industries Inc., Medina, MN (US)

(72) Inventors: Michael A. Hedlund, Roseau, MN (US); Joseph D. Tharaldson, Taylor Falls, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 16/018,513

(22) Filed: Jun. 26, 2018

(65) Prior Publication Data

US 2019/0003403 A1 Jan. 3, 2019

Related U.S. Application Data

(60) Provisional application No. 62/527,299, filed on Jun. 30, 2017.

(51) Int. Cl.
| | | |
|---|---|---|
| *F01L 9/04* | (2006.01) | |
| *F02D 11/10* | (2006.01) | |
| *F02D 9/10* | (2006.01) | |
| *F02D 41/28* | (2006.01) | |
| *B62K 11/14* | (2006.01) | |
| *B62K 23/06* | (2006.01) | |
| *F02D 41/00* | (2006.01) | |
| *B62M 27/02* | (2006.01) | |
| *F02D 9/02* | (2006.01) | |
| *F02D 41/22* | (2006.01) | |

(52) U.S. Cl.
CPC ............ *F02D 11/106* (2013.01); *B62K 11/14* (2013.01); *B62K 23/06* (2013.01); *B62M 27/02* (2013.01); *F02D 9/105* (2013.01); *F02D 41/0002* (2013.01); *F02D 41/28* (2013.01); *B62M 2027/023* (2013.01); *F02D 41/222* (2013.01); *F02D 2009/0294* (2013.01); *F02D 2200/0404* (2013.01); *F02D 2400/08* (2013.01)

(58) Field of Classification Search
CPC .................. F02D 9/105; F02D 11/106; F02D 2009/0294; F02D 2200/0404; F02D 2400/08
USPC ....................................... 123/90.11, 352, 399
See application file for complete search history.

(56) References Cited

U.S. PATENT DOCUMENTS

| | | | |
|---|---|---|---|
| 3,845,847 A | 11/1974 | Camp | |
| 4,838,113 A * | 6/1989 | Matsushima | ............ B62J 33/00 74/551.8 |
| 5,321,980 A | 6/1994 | Hering et al. | |
| 7,315,779 B1 * | 1/2008 | Rioux | ...................... B62J 27/00 123/352 |

(Continued)

OTHER PUBLICATIONS

AlSentis HSS Touch Recognition Technology, Product Overview, 2012.

(Continued)

*Primary Examiner* — Ching Chang
(74) *Attorney, Agent, or Firm* — Harness Dickey

(57) ABSTRACT

Disclosed is a verification system including a throttle actuation verification system. The verification system may include one or more sensors positioned at a location that will receive a force applied by an operator when a throttle lever is engaged or loaded for the intention to be actuated by the operator. A signal from the sensor is compared to a throttle position.

23 Claims, 9 Drawing Sheets

(56) References Cited

U.S. PATENT DOCUMENTS 8,866,497 B2  10/2014  Caldwell et al.

OTHER PUBLICATIONS

AlSentis, HSS Basic 1-15 Discrete Touch Button Sensors Chip, 25 pages, 2012.
AlSentis, HSS Robust 1-6 Input Touch Button Chipsets, 42 pages, 2018.
AlSentis, HSS Robust 1-6 Input Touch Chipsets, 21 pages, 2012.
AlSentis HSS Touch Recognition Technology, overview, https://vimeopro.com/alsentis/alsentis/video/250061559, 2018.

* cited by examiner

THROTTLE ACTUATOR POSITION VERIFICATION

CROSS-REFERENCE TO RELATED APPLICATIONS

This application claims the benefit of U.S. Provisional Application No. 62/527,299, filed on Jun. 30, 2017. The entire disclosure of the above application is incorporated herein by reference.

FIELD

The present disclosure relates to operator safety and particularly to a throttle verification and operation system.

BACKGROUND

This section provides background information related to the present disclosure which is not necessarily prior art.

Vehicles may be used in various applications and conditions. One example of a vehicle is a snowmobile that is generally exposed to harsh and varying environments. The environments may interact with control systems of the vehicles in unintended manners. The unintended action caused by the environment may include sticking of various components and assemblies.

Snowmobiles may generally be provided including a frame, suspension, running boards, and other assemblies including an engine assembly to power an endless belt or track to drive the snowmobile. The engine may have a throttle system that is operated by a throttle lever positioned remote from the engine. The throttle lever may generally be manually operated by an operator of the snowmobile. The operator may generally depress or move the throttle lever to, in turn, operate a throttle at the engine with an intention to power the snowmobile to drive the endless track.

SUMMARY

This section provides a general summary of the disclosure, and is not a comprehensive disclosure of its full scope or all of its features.

In various embodiments, a throttle articulation verification system may be equipped onto a vehicle. The vehicle may include appropriate vehicles such as a snowmobile, ATV, or other appropriate off-road or on-road vehicle. The verification system may be integrated into or attached to a throttle lever or actuator to assist in providing a verification signal to an engine control unit (ECU). The signal from the verification system (VS) may be in addition to and/or complement (e.g. to be compared with) a signal from a throttle position sensor (TPS). The VS may also include a sensor positioned with or on a throttle cable or throttle hand, including a hand control body.

In various embodiments, the VS may include one or more sensors positioned on or integrated with the throttle lever to send a signal with or subsequent to the actuation of the throttle lever. The actuation may include moving, engaging, or pressing the throttle lever by an operator. The signal sent by the VS may be compared to a signal from the TPS to confirm location or intended movement of the throttle lever relative to the TPS.

In various embodiments, an operator sensor may also be provided. The operator sensor operates to sense that an operator is presently on or in the vehicle. For example, a proximity or pressure sensor may be present to determine that the operator is in an appropriate operating position or proximity.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. Although the following description includes several examples of a snowmobile application, it is understood that the features herein may be applied to any appropriate vehicle, such as motorcycles, all-terrain vehicles, etc. Moreover, while the description herein includes specific examples of a throttle lever connected to a handlebar, the throttle lever may be connected or actuated with other portions rather than a hand or digits thereof.

Figure 1A:
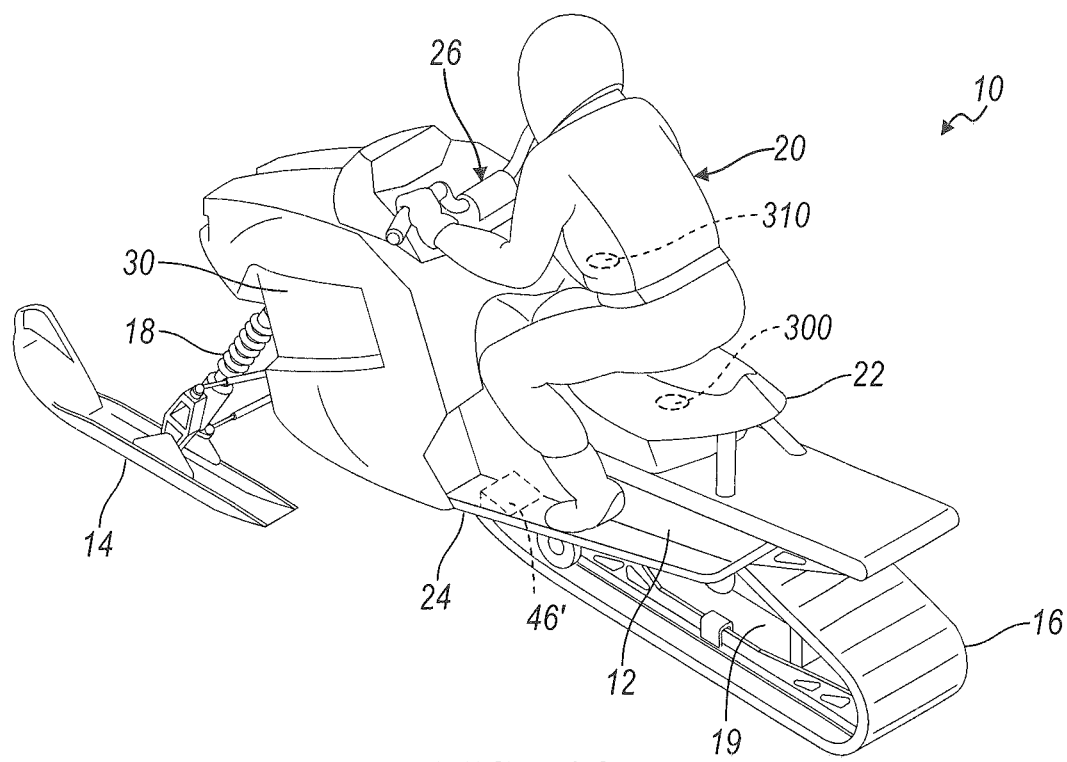
FIG. 1A is an environmental view of a vehicle, according to various embodiments.
Figure 1B:
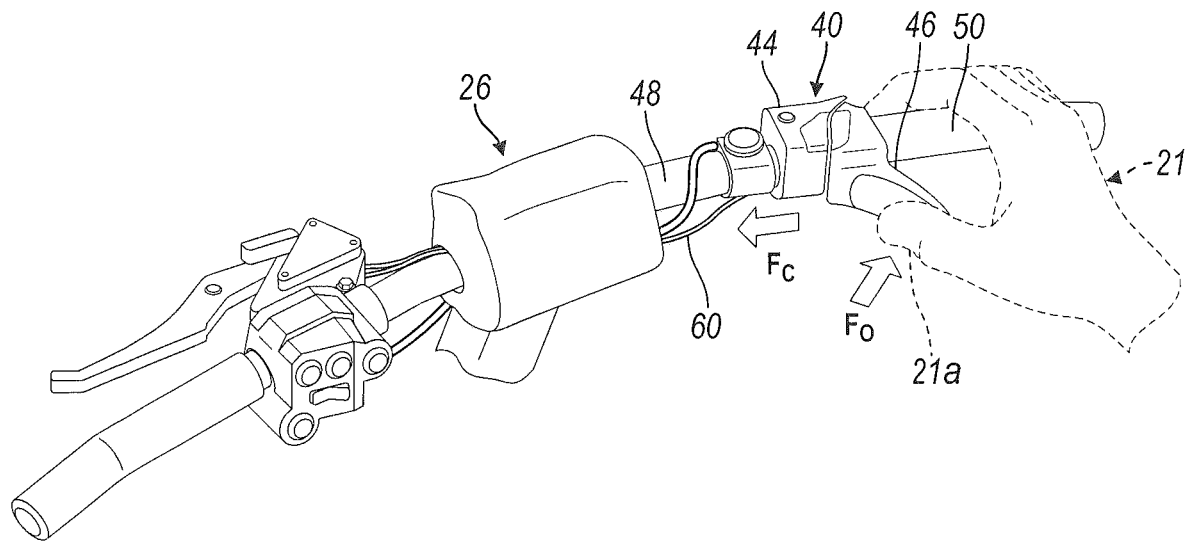
FIG. 1B is a detailed view of a throttle actuator, according to various embodiments.

With reference to FIG. 1A and FIG. 1B, a snowmobile 10, according to various embodiments, is exemplarily illustrated. Snowmobile 10 may include various assemblies and subassemblies including a frame 12 that is supported by one or more forward or front skis 14 and an endless track assembly 16. Each of the front skis 14 may be supported by a suspension assembly 18 and the endless track assembly 16 may be supported by a rear suspension assembly 19. An operator, user, or rider 20 may ride or be supported on a seat assembly 22 mounted on the frame assembly 12. The operator 20 may also engage one or more running boards 24 with feet of the operator 20. Further, a steering assembly 26 may be engaged by hands 21 and/or digits 21a of the operator 20, as discussed further herein. In addition, the frame assembly 12 may be encapsulated or covered, at least in part, by various body coverings, including a front body covering or cowl 30.

Figure 10A:
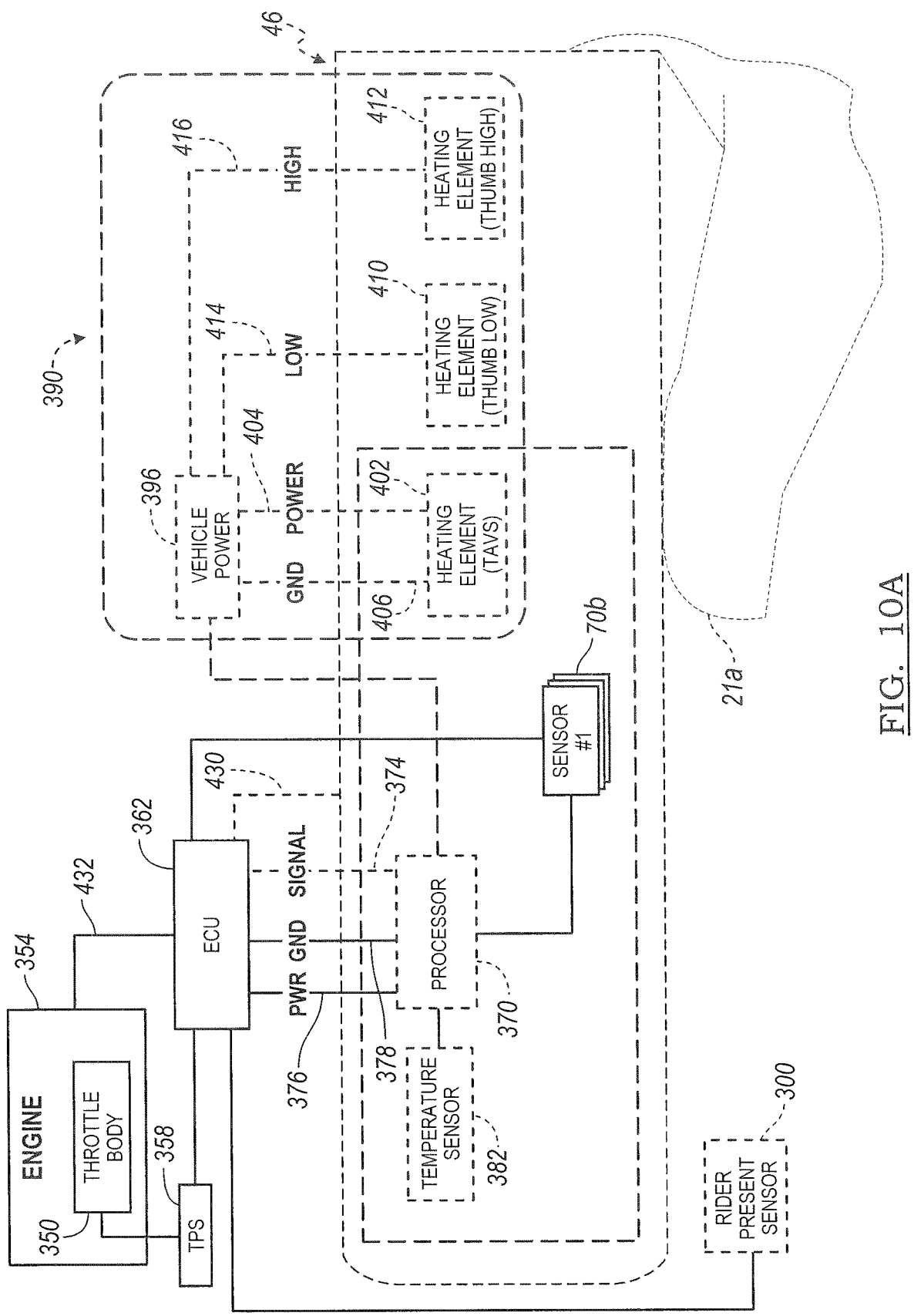
FIG. 10A is a schematic block diagram of components of the vehicle of FIG. 1A and verification system.
Figure 10B:
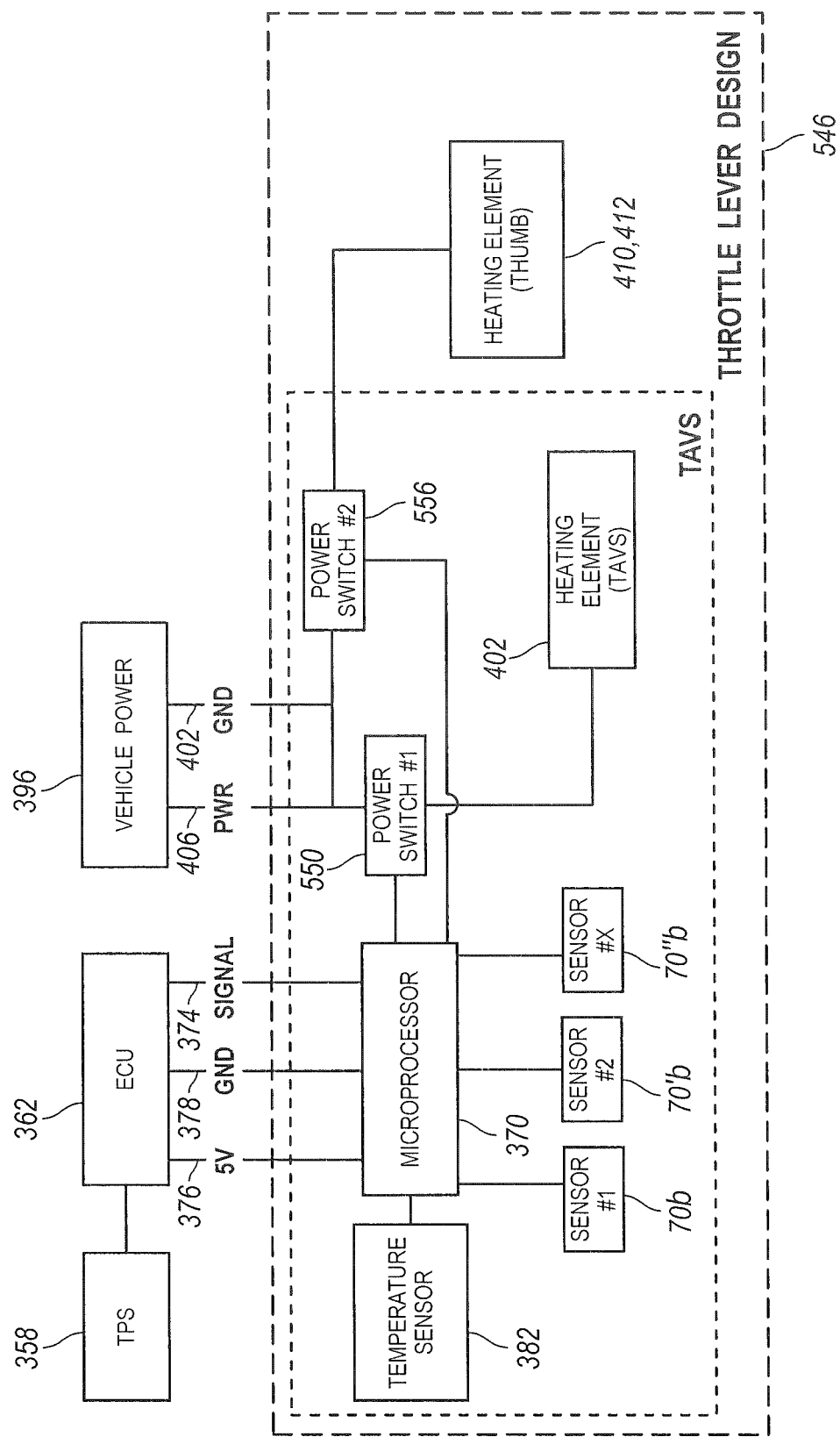
FIG. 10B is a schematic block diagram of components of the vehicle of FIG. 1A and verification system, according to various embodiments.
Figure 10C:
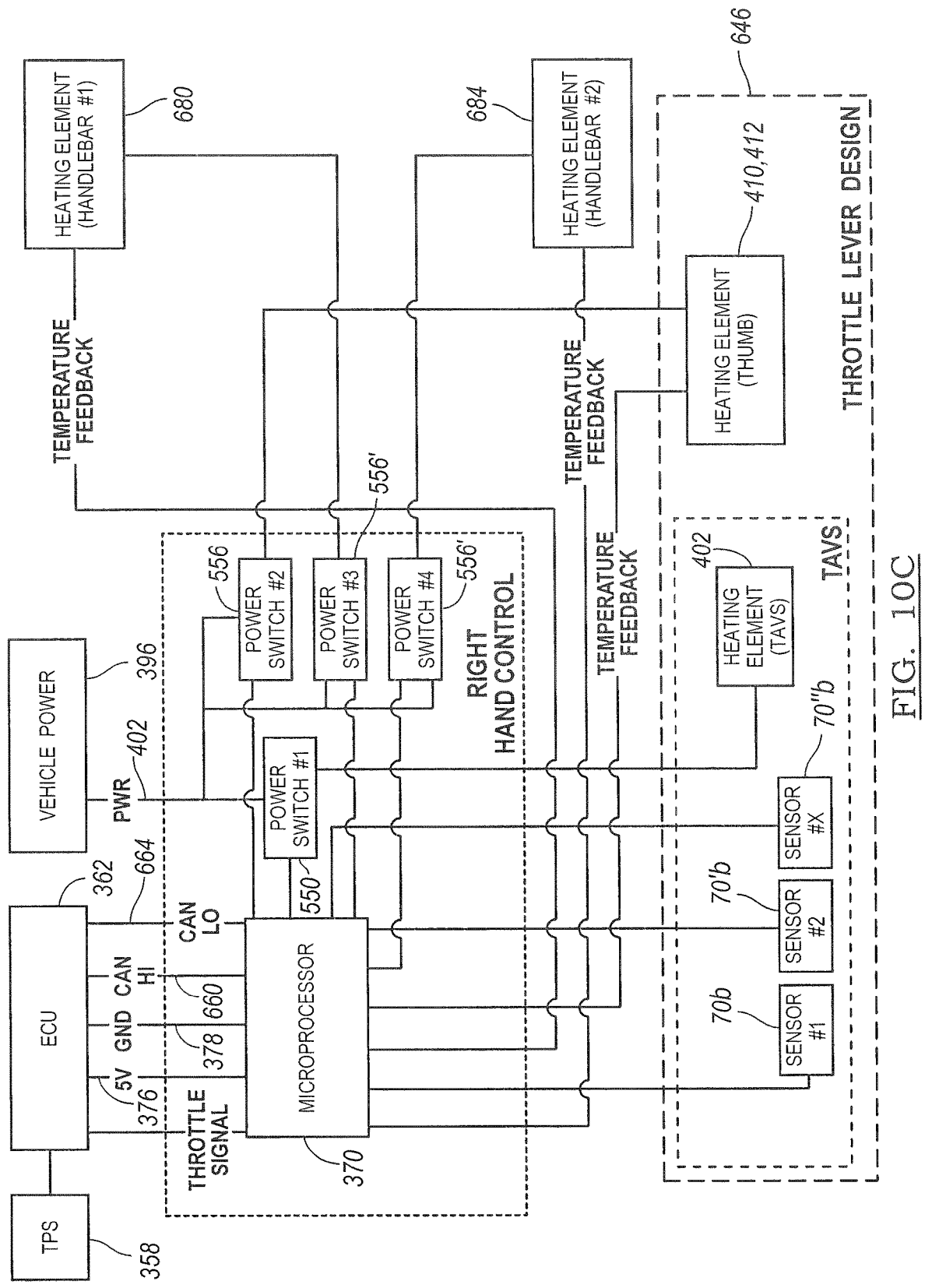
FIG. 10C is a schematic block diagram of components of the vehicle of FIG. 1A and verification system, according to various embodiments.

Within the frame assembly 12 and cover 30 may be a powertrain including at least an engine 354 (FIG. 10A, 10B, or 10C). The powertrain may be operated by the operator 20 to power the endless track 16, and in turn, move the snowmobile 10 and the operator 20, when riding on the snowmobile 10. The operator 20 may operate the snowmobile 10 by engaging and operating a throttle hand control 40. The throttle hand control 40 may have a linkage to at least a portion of a throttle body 350 (FIG. 10A, 10B, or 10C) in the engine 354. The linkage may be a direct physical connection, such as a cable, and/or may include an electronic connection, such as with a "drive-by-wire" system.

With continued reference to FIG. 1A and additional reference to FIG. 1B, the throttle hand control 40 may also be referred to as a throttle operator and include a throttle hand control body or mount 44 and a throttle lever or actuator 46. The throttle lever 46 may also be referred to as a flipper or a pedal, such as a foot pedal 46', or other appropriate throttle actuator.

The throttle lever 46 may be moveable relative to the hand control body 44, such as by pivoting. The throttle hand control 40 may be mounted (e.g. fixed) to a handlebar or grip bar 48. The handle bar 48 may be moved by the operator 20 to steer the snowmobile 10. The grip bar 48 may include an extension or a hand grip portion 50 extending past the throttle hand control 44.

As is generally understood in the art, the operator 20 may engage at least to the throttle lever 46 with a portion of the operator's hand 21, including the digit (e.g. thumb) 21a to move the throttle lever 46 relative to the hand control body 44 and/or the handgrip portion 50. Movement of the throttle lever 46 generally causes movement of a throttle portion (e.g. a throttle valve) in a throttle body at the engine to either accelerate or decelerate the engine speed. A throttle position sensor (TPS) 358 (FIG. 10A), may sense the throttle position and send a TPS signal to an engine control module, including an engine control unit (ECU) 362 (FIG. 10A). A verification signal may be sent or received from a throttle activation verification system (TAVS) that includes one or more verification system (VS) sensors at or near the throttle actuator 46 to sense force from the operator 20 on the throttle actuator 46, as discussed herein, is also sent to the ECU 362 to verify an intention to open a throttle or increase engine RPMs. Alternatively or in addition to the TAVS may be a rider present signal from a tether or rider present system, as also discussed herein.

Figure 2:
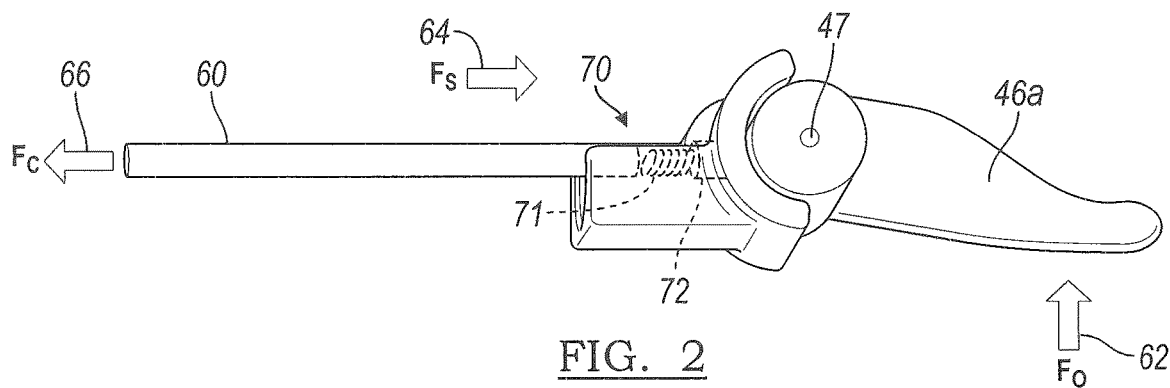
FIG. 2 is a detailed view of a throttle actuator and verification system, according to various embodiments.

With reference to FIG. 2, a throttle lever 46a is illustrated according to various embodiments. The throttle lever 46a may be connected to a throttle linkage, the throttle linkage may include a throttle cable 60, as illustrated in FIG. 2 that is connected to the throttle valve at the engine. The throttle cable 60 provides a force on the throttle lever 46a that must be overcome to operate the throttle in the engine as the throttle lever is pushed toward the handgrip portion 50 by the user 20. An operator force ($F_o$) is applied generally in the direction of arrow 62. The $F_o$ applied toward the handgrip portion 50 may overcome a throttle force $F_c$ (e.g. a throttle cable) that is generally in the direction of arrow 66. The VS may include a VS sensor system or assembly, such as a sensor assembly 70 to confirm or verify the position of the throttle lever 46a. The VS, as discussed herein, may provide a verification signal to an engine control unit (ECU) 362 (FIG. 10A, 10B, or 10C) regarding an intended or actual position of the throttle lever.

The sensor assembly 70 may include a spring 71 that operates or acts on a sensor 72. The spring 71 actuates or activates the sensor 72 (e.g. a switch). Thus, the operator force in the direction of arrow 62 must first overcome a spring force ($F_s$) of the spring 71 generally in the direction of arrow 64 that is generally in a direction opposite of the throttle force in the direction of arrow 66.

When the user or operator 20 overcomes the spring force $F_s$ of the sensor assembly, a signal sent to the ECU to indicate that the operator 20 is applying a force to the throttle lever 46a and intends to move or power the snowmobile 10. Therefore, the ECU may operate and control the motor as generally programmed under normal operating conditions (e.g. increased throttle requires increased fuel and/or increased engine rotations per minute (RPM)). The throttle force $F_c$ in the direction of arrow 66, however, may become zero or negligible relative to the throttle lever 46 if the cable 60 becomes stuck in any position. If the cable 60 does not move when the throttle lever 46 is released, the spring 71 compresses against the sensor 72. When the spring engages, directly or indirectly, the sensor 72, a signal is sent to the ECU indicating that the throttle lever 46 has been disengaged.

If the cable 60 is struck, however, the throttle cable 60 does not move, thus the throttle may remain open. The ECU, upon receiving the signal from the sensor 72 may change the operation of the engine to a selected mode, such as a limp mode, when the signal is received. The limp mode may be any selected operational mode such as controlled by the ECU or any appropriate control module, such as to disable a spark to the engine, generate a diagnostic trouble code, cutoff fuel to the engine, reduce the throttle valve opening, reduce the exhaust valve opening, reduce transmission gearing, or other appropriate control of the engine to eliminate or reduce power by the engine to slow the snowmobile 10, and in any combination of previous mentioned methods.

It is understood, as discussed herein, that the throttle 350 in the engine 354 need not be operated directly by a physical connection to the throttle 350, such as from the throttle cable 60 extending from the throttle lever 46. In various embodiments, an electronic throttle control (ETC) (also referred to as drive-by-wire) is provided or operated. When an ETC is operated, a lever position sensor at or near the throttle lever 46 may sense a position of the throttle lever 46 and send the signal to the throttle directly or through the ECU. The throttle may then be moved (for example by an electric motor) to the selected positioned based on the sensed position of the throttle lever 46. Nevertheless, a VS sensor may be provided to confirm and/or verify the position of the throttle lever.

In various embodiments, the throttle lever 46 is configured to incorporate various additional or alternative switches to generate or transmit the VS signal regarding an intention of the operator 20 to move the throttle lever 46 based upon at least an initial movement and/or flex of the throttle lever 46. The sensors, also referred to as VS sensors, may be incorporated into or connected directly to the throttle lever 46. The sensors sense contact and/or force applied to the throttle lever 46. In this way, confirmation of contact with the throttle lever 46 may be confirmed or verified for confirming an operation of the engine, as discussed herein.

Figure 3A:
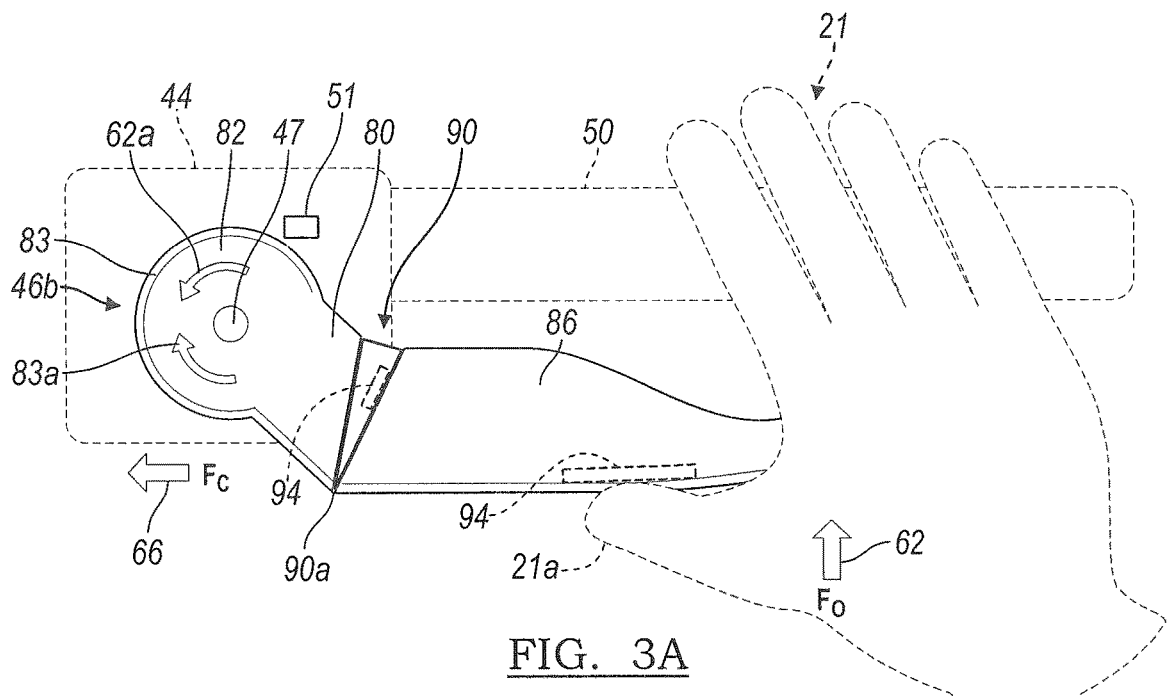
FIG. 3A is a detailed schematic view of a throttle actuator and a verification sensor, according to various embodiments.
Figure 3B:
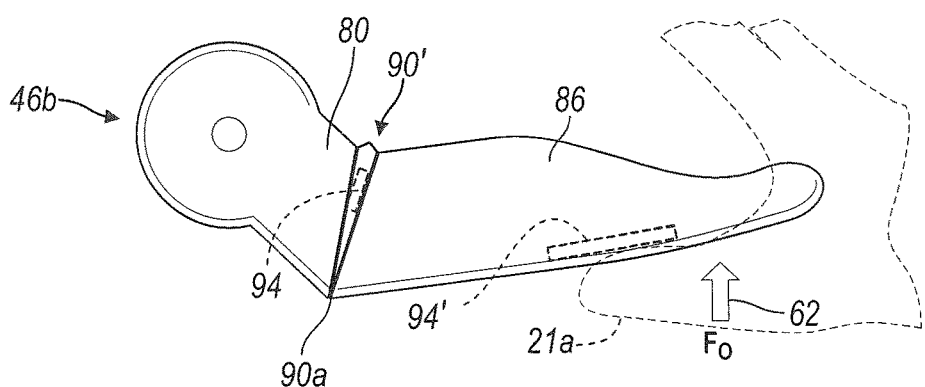
FIG. 3B is a detailed view of an actuated orientation of the throttle actuator of FIG. 3A.

Turning reference to FIG. 3A and FIG. 3B, a throttle lever 46b is illustrated that may include a first portion 80 that includes or forms a pivot region 82 relative to the hand control body 44. If provided, the throttle cable 60 is connected to the first portion 80 and/or the pivot portion 82 such that a cable force $F_C$ generally in the direction of arrow 66 away from the throttle lever 46b is provided. It is understood, however, in the ETC a return spring 83 is provided that will cause a force generally in the direction of arrow 66. Thus, the cable or throttle force in the direction of arrow 66, as discussed herein, is not necessarily caused by a cable, but may be a throttle force or the force that is overcome by the operator force to operate the throttle 350. The spring 83 may be provided in any appropriate location, but will generally bias the throttle lever 46b opposite the operator force $F_o$, such as in the direction of arrow 83a. The operator force $F_o$ in the direction of arrow 62 may cause rotation of the throttle lever 46b, or any appropriate embodiment of the throttle lever 46, to rotate around an axle or point 47 generally in the direction of arrow 62a. A rotation or throttle lever position sensor 51 may sense the position of the throttle lever 46b for operating the throttle. The throttle lever 46b may include a second portion 86 that may be contacted directly by the operator 20 to operate the throttle by moving the throttle cable 60.

In various embodiments, the VS may include the first throttle lever portion 80 may be separated, at least partially, by a gap 90 from the second throttle lever portion 86. The gap 90 may be filled with a selected material that is the same or different than the material of the first portion 80 or the second portion 86. The gap filling member or material may include a soft epoxy, a rubber compound, an elastomer type material, a cellular foam material, or a silicone based compound. The gap 90 forms or is near a second rotation or hinge region 90a. At the hinge region 90a the second portion 86 is able to move relative to the first portion 80. The initial motion of first movement of the throttle lever 46b, therefore, may be allowed due to the hinge region 90a.

The gap 90 may further include a sensor 94, such as those discussed herein, to generate the VS signal when movement between the second throttle lever portion 86 and the first throttle lever portion 80 occurs due to the operator 20 providing or applying the operator force generally in the direction of arrow 62 toward the handlebar 50.

As discussed above, the operator 20 applies the operator force generally in the direction of arrow 62 to move the throttle lever 46b toward the handlebar 50. Upon applying the operator force in the direction of arrow 62, the second throttle portion 86 generally moves in the direction of arrow 62 towards the handlebar 50. Through movement and/or deflection of walls of the gap 90 and/or material filling the gap 90, the sensor 94 senses a deflection in the throttle lever, such as due to a contact or the force applied by operator 20 in the direction of arrow 62, and sends the VS signal regarding sensing the operator force.

The VS signal is sent to the ECU to indicate that the throttle lever 46b is having the operator force applied thereto. The operator force in the direction of arrow 62 may then overcome the force of the cable 60 and/or return spring 83 generally in the direction of arrow 66 to operate the throttle. When the operator 20 releases the throttle lever 46b and no longer applies the operator force in the direction of arrow 62, the sensor in the gap 90 cease generating the VS signal as the operator force in the direction of arrow 62 has been removed.

The operator force, after being removed, generally allows the cable force in the direction of arrow 66 to return and decrease the throttle. (It is understood that the cable force in the direction of arrow 66 may refer to any force that is overcome to increase the throttle at the engine whether provided by the cable 60 or the return spring 83). If the cable 60, the return spring 83, or some other portion is stuck or immovable for any reason, however, the throttle at the engine may not be decreased. Accordingly, the ceasing of the generation of the VS signal from the sensor 94 in the gap 90 may signal the ECU to change the operation mode of the engine. As discussed above, upon ceasing of the generation of the VS signal from the sensor 94, the ECU may change the operation mode of the engine to a limp or less than full power operational mode even if the throttle is open or the signal from the TPS indicates an open or high throttle position.

The sensor 94 may be an appropriate sensor such as a pressure sensors that change resistance based on an amount of pressure applied, strain gauges, piezoelectric, force sensing resistor (FSR), Hall Effect sensors (and an appropriate magnetic material used therewith), or other appropriate sensor. In various embodiments, as discussed herein, the sensor 94 (or any appropriate identified sensor) may be a touch indication sensor including a capacitive (capacitance) touch sensor, resistance, or piezo touch switch may also be provided to determine contact by the operator 20 with the throttle lever 46. The sensor 94 senses a pressure applied in the gap area 90 due to the operator force $F_o$ in the direction of arrow 62. The operator force applied by the operator 20 may be enough to move or deflect the gap 90, such as with a first or initial movement of the second portion 86, and apply a force to the sensor 94. The sensor 94 may be a pressure or strain sensors and senses an amount of strain or pressure in the gap 90, where the strain or pressure increases as the operator force is applied in the direction of arrow 62.

With particular reference to FIG. 3B, the first portion 80 and the second portion 86 of the throttle lever 46b may be formed of a selected material, or may be formed of two separate selected materials. The gap 90 may be an air gap or may be filled with a selected material that is either the same or different from the material that forms the first portion 80 or the second portion 86. For example, the material filling the gap 90 may have a modulus of elasticity less than the material used to form the first portion 80 and the second portion 86. Accordingly, the material in the gap 90 may flex or deflect more than the material forming the second portion 86 and the first portion 80 and also before the cable force Fc is overcome to move the throttle. Accordingly, the operator force generally the direction of arrow 62 will cause a flexure or deflection relative to the gap 90 prior to overcoming the throttle or cable force. Thus, there is an initial movement or deflection of the throttle lever 46b (or the throttle lever according to the various embodiments discussed herein, prior to operating the throttle 350. The deflection in the gap

90 may form or cause a deflected gap 90' to allow the sensor 94 to sense the application of the operator force generally the direction of arrow 62. The force of the cable in the direction of arrow 66 will not be overcome until the sensor 94 senses the applied force in the direction of arrow 62.

Accordingly, the sensor 94 may be provided in the throttle lever 46*b* to generate the VS signal based upon an application of the operator force generally in the direction of arrow 62. Regardless of the operability of the throttle, the cable 60, the return spring 83, etc., the ECU is provided with the VS signal regarding an intention of the operator 20 to move the throttle lever 46*b*.

Briefly, in operation, as generally illustrated in FIG. 1A the operator 20 engages the handle bar 50 with the hand 21 where the digit, such as a thumb 21*a* engages at least the first portion 86 of the throttle lever 46*b* to move the throttle lever 46*b*. The remaining portion of the hand 21 of the operator 20 engages the handle bar 50 to provide leverage for applying the force in the direction of the arrow 62 to the lever 46*b*. The throttle lever 46*a* may be operated by one or more digits of the hand 21 of the operator 20. It is understood, however, that the throttle mechanism including the throttle lever 46*b* may be operated by the entire hand (e.g. a palm) or may be repositioned for operation such as application of a force by a foot, torso member, arm member, or the like.

In various embodiments, including the embodiments illustrated in FIGS. 3A and 3B, and as discussed herein, the sensor 94 may be replaced by or augmented by a touch sensitive (e.g. a capacitive touch) sensor 94'. The touch sensor 94' may sense touch or presence of the digit 21*a* and may operate at the VS sensor. Thus, the sensor 94' may also provide a signal similar to the signal from the sensor 94 as discussed above and herein regarding presence of the digit 21*a* and/or a force applied by the digit 21*a*.

Figure 4A:
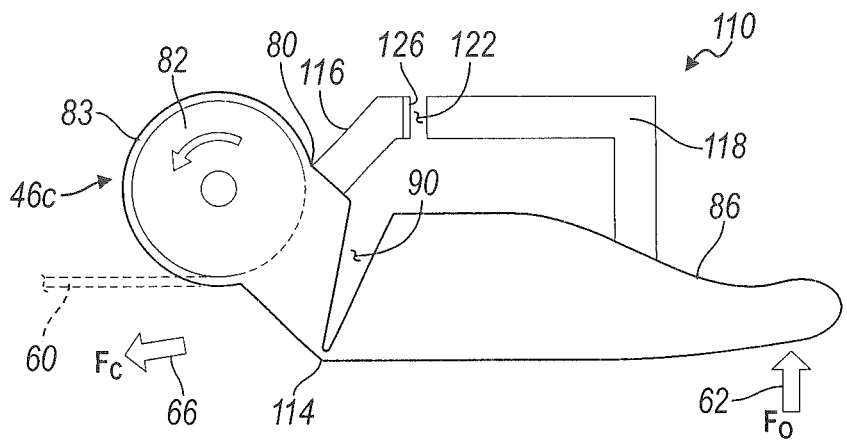
FIG. 4A is a detailed view of a throttle actuator, according to various embodiments.
Figure 4B:
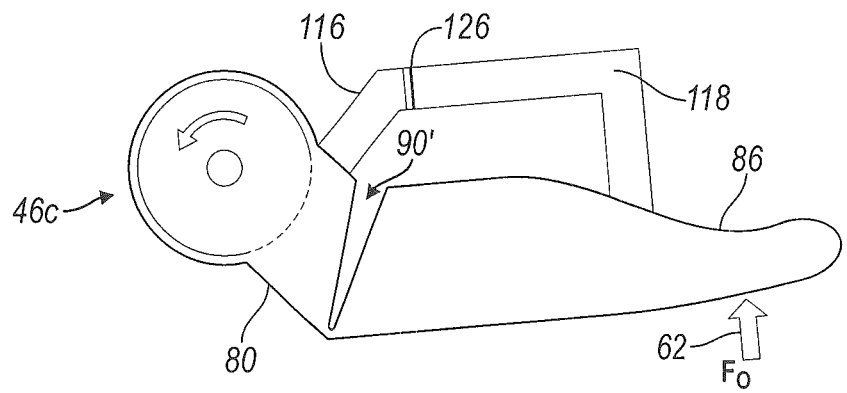
FIG. 4B is a detailed view of an actuated position of the throttle actuator of FIG. 4A.

With continued reference to FIG. 1A and FIG. 1B and additional reference to FIG. 4A and FIG. 4B a throttle lever 46*c* is illustrated. The throttle lever 46*c* may be similar to the throttle lever 46*b*, discussed above and illustrated in FIG. 3A. The throttle lever 46*c*, however, includes an ancillary or sensor extension arm 110. The throttle lever 46*c* includes the first portion 80 and the second portion 86 and the pivot portion 82. The throttle cable 60 (if present) may be connected near the first portion 80 and provide the cable force generally in the direction of arrow 66. Again, the operator 20 applies the operator force $F_o$ generally the direction of arrow 62 to the first portion 86 of the throttle lever 46*c*. The gap 90 is formed between the first portion 80 and the second portion 86. Again, a selected material or member may be placed in the gap 90. The member or portion in the gap 90 may be formed of material that is the same or different than the material forming the first portion 80 or the second portion 86 or may be an open space.

If no material is placed in the gap 90, the first portion 80 and the second portion 86 may be connected and move or flex relative to one another by a mechanical hinge or a living hinge in a hinge region 114. The hinge region 114 may be a thin material that is the same material forming the first portion 80 and the second portion 86. Accordingly the throttle lever 46*c* may be formed as a single member including the hinge portion 114, which may be a living hinge.

The sensor arm 110 includes a first sensor arm portion 116 and a second sensor arm portion 118. The first sensor arm portion is connected to the first portion 80 of the throttle lever 46*c*. The second sensor arm portion 118 is connected to the second portion 86 of the lever arm 46*c*. As the operator force is applied in the direction of the arrow 62, the living hinge 114 may flex or move and cause the second portion 86 to move towards the first portion 80, and thereby cause the second sensor arm portion 118 to move towards the first sensor arm portion 116.

A sensor gap 122 is provided between the first sensor arm portion 116 and the second sensor arm portion 118 when the operator force is not applied in the direction of arrow 62. The sensor gap 122 may be similar to the gap 90 and a sensor 126 may be positioned at a terminal end of either the first sensor arm portion 116 or the second sensor arm portion 118. As the operator force is applied, generally in the direction of arrow 62, and the second sensor arm portion 118 moves towards the first sensor arm portion 116, the sensor gap 122 may diminish and/or close to allow for the sensor 126 to sense that the operator force $F_o$ is being applied. The sensor 126 can be a proximity sensor (e.g. Hall Effect sensor) to sense that the sensor gap 122 has been diminished and/or a contact sensor (e.g. pressure sensor) to sense that the second sensor arm portion 118 is contacting the first sensor arm portion 116. In various embodiments, such as with a Hall Effect sensor, a magnetic member or portion may be placed opposite the sensor portion within the gap 90.

Regardless of the type of sensor, the sensor 126 is provided to generate the VS signal based upon the movement of the second sensor arm portion 118 relative to the first sensor arm portion 116. Upon contact or a selective proximity, the sensor 126 generates the VS signal, similar to the signal generated by the sensor 94 as discussed above. The VS signal is sent to the ECU, and may be related to the TPS signal regarding the sensed position of the throttle. As discussed above, if the VS signal from the sensor 126 indicates that the operator force is being applied in the direction of the arrow 62 to overcome the force of the cable Fc and the TPS indicates an open or high-throttle position, then the engine may be operated according to normal operating procedures. However, if no signal from the sensor 126 is being generated, but the TPS sensed position is open or at full or high-throttle, then the ECU may change the mode of operation of the engine to a selected mode, such as a limp mode (e.g. as discussed above). When the VS signal is not present but a high TPS signal is sent, it may indicate that the operator 20 is not intending that throttle should be provided and the engine speed or power may be reduced or eliminated.

Figure 5:
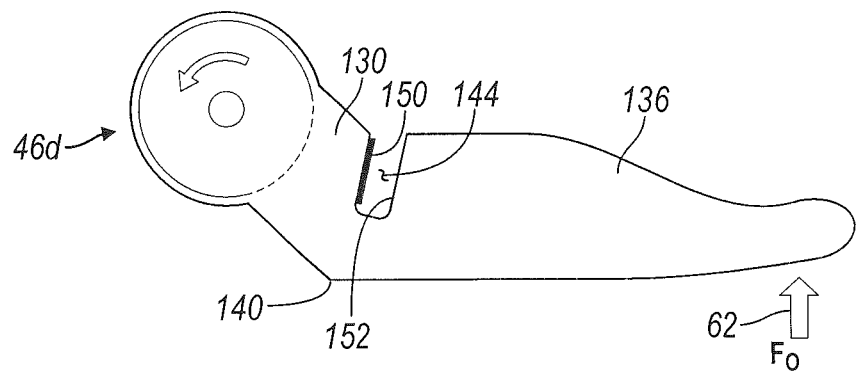
FIG. 5 is a detailed view of a throttle actuator and verification sensor, according to various embodiments.

With reference to FIG. 5, a throttle lever 46*d* is illustrated. The throttle lever 46*d* includes a first portion 130 and a second portion 136. The first portion 130 and the second portion 136 is connected by a hinge portion 140. The hinge portion 140 may be formed of the same material as the first portion 130 and the second portion 136 such that the throttle lever 46*d* may be formed as a single member. A gap 144 is formed between the first portion 130 and the second portion 136 opposite or adjacent to the hinge region 140. The gap 144 may be an open air gap or may be filled with a selected material, as discussed above. The material filling the gap 144, if selected, may be the same or different than the material that forms either or both of the first portion 130 or the second portion 136. The gap 144 may have a sensor 150 positioned therein. The hinge portion or region 140 of the throttle lever 46*d* may include a selected rigidity based on various factors, such as material and material thickness. Thus, the gap 144 may be designed and formed based on the type of sensor placed therein. The hinge region 140, however, may have a greater resistance to bending or moving than the hinge region 90*a*.

The sensor 150 may be a contact or proximity sensor, as discussed above. The sensor 150 may sense movement of the second portion 136 relative to the first portion 130 such as by a change of proximity of a terminal end 152 of the second portion 136 or contact with the terminal end 152 of the second portion 136. Thus, the sensor 150 may include a pressure or strain gauge to detect contact or may include a Hall effect sensor to determine or sense proximity The lever 46d may be similar to the lever 46b, discussed above save for the design of the gap 144 relative to the first portion 130 and the second portion 136. Further, as the second portion 136 has the operator force applied thereto, the hinge region 140 will deflect and the sensor 150 will sense the selected characteristic, such as pressure, strain, etc. Accordingly, pressure or contact relative to the sensor 150 is determined and the sensor 150 generates the VS signal indicating the operator force in the direction of arrow 62 to move the second portion 136 towards the first portion 130.

As discussed above, the VS signal generated by the sensor 150 is sent to the ECU to indicate that the operator 20 is moving the throttle lever 46d to attempt to increase throttle or increase the speed of the engine. As discussed above, if the TPS sensed throttle position is an open throttle or a high engine speed signal, but the sensor 150 is not generating the VS signal, then the ECU will change the mode of operation of the engine, such as to a limp or inactive mode. Therefore, the sensor 150 in the gap 144 senses the force of the operator 20 to move the throttle lever 46d to attempt to operate the engine.

Figure 6:
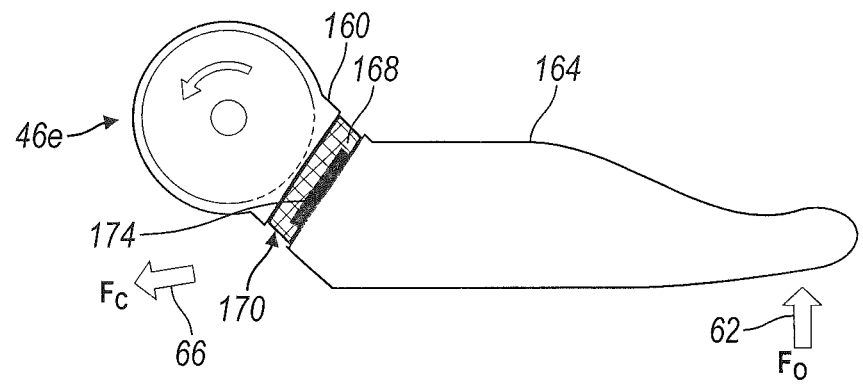
FIG. 6 is a detailed view of throttle actuator and verification sensor, according to various embodiments.

With reference to FIG. 6, a throttle lever 46e is illustrated. The throttle lever 46e is similar to the throttle lever 46d except that it includes a first portion 160 and a second portion 164 where the first portion 160 is entirely separate from the second portion 164. The throttle lever 46e, however, includes a spacer or spacing member portion 168 positioned in a gap 170 between the first portion 160 and the second throttle lever portion 164. The spacer member 168 may be formed of a material different than the material that forms the first portion 160 and the second portion 164. The spacer member 168, therefore, allows the deflection or compression when the operator force is applied in the direction of arrow 62. The second portion 164 compresses or applies a force to the spacer member 168 to allow movement of the second portion 164 relative to the first portion 160.

The spacer member 168 may be, however, a portion that is formed of the same material as the first portion 160 and/or the second portion 164. The spacer member 168 may also include a selected geometry such that it flexes or deflects at a lower applied force than the first or second portion 160, 164. Thus, the spacer member 168 need not be formed of a material different than the first portion 160 or second portion 164.

On the terminal end of either the first portion 160 or the second portion 164 near the spacer member 168 may be a sensor 174. The sensor 174 may also be formed in any region of the spacer member 168 that is able to receive a force when the operator 20 applies the operator force generally in the direction of arrow 62. For example, a pressure sensor may be positioned within the spacer member 168 and the spacer member 168 formed of a material that flexes or may be compressed when the force is applied in the direction of arrow 62. The compression of the spacer member 168 applies the force to the sensor 174 so that the sensor 174 provides the VS signal to the ECU of the engine.

As discussed above, the application of the force in the direction of arrow 62 by the operator 20 is an indication of a desire or selection to apply or increase throttle. The sensor 174 is used to sense the operator force applied by the user 20. When the user 20 stops applying the operator force in the direction of arrow 62, the sensor 174 ceases to generate the VS signal. Therefore, the signal from the sensor 174 or lack thereof is provided to the ECU to determine a proper mode of operation of the engine based at least in part on whether the operator force is no longer applied to the throttle lever 46e, even if the throttle position sensor is in an open or high throttle position.

The spacer member 168 may be formed of a selected material that may have a selected elasticity or compressibility relative to (e.g. different than) the second portion 164. The spacer member 168 may be compressible or deformable, such as being formed of materials as discussed above, under a force less than the force of the throttle cable 60 generally in the direction of arrow 66. Accordingly, the spacer member 168 is formed and/or includes a geometry, position, or other feature of the spacer member 168 to allow for the sensor 174 to generate the VS signal prior to overcoming the cable force in the direction of arrow 66 ($F_c$) when the operator applies the force in the direction of arrow 62 ($F_o$).

Figure 7:
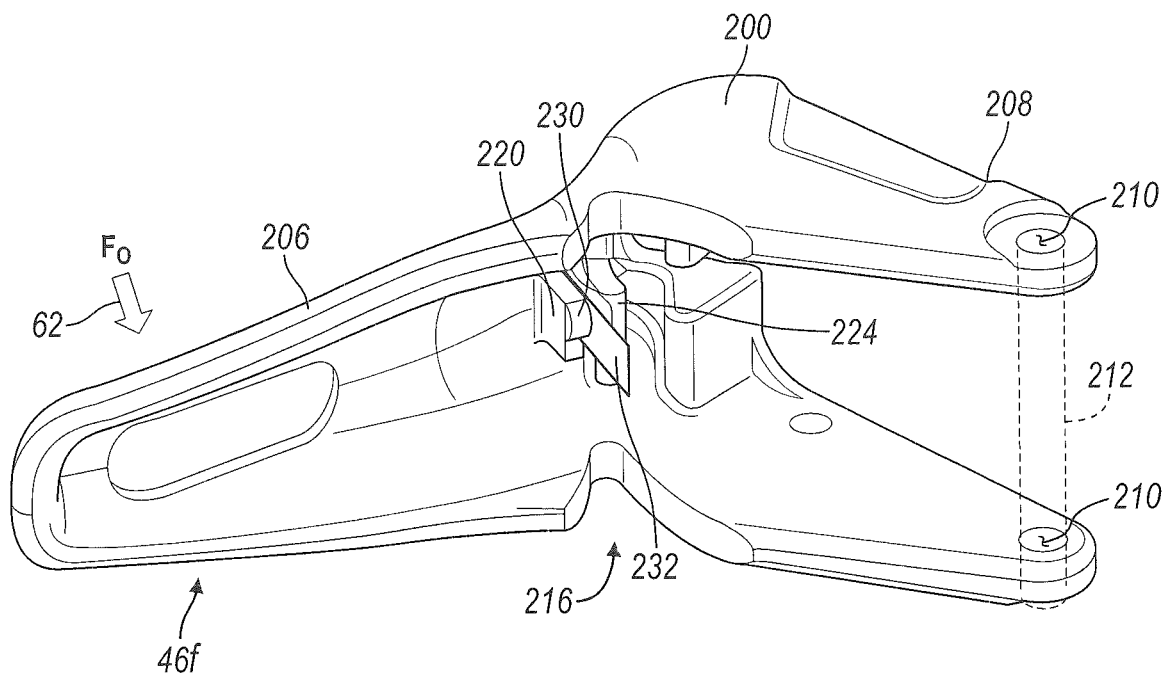
FIG. 7 is a detailed view of a throttle actuator and verification sensor, according to various embodiments.

With reference to FIG. 7, a throttle lever 46f is illustrated. The throttle lever 46f includes features similar to those described above, for example similar to the throttle lever 46c or the throttle lever 46d. The throttle lever 46f includes a first portion 200 and a second portion 206. The first portion 200 includes an axle or rod engaging portion 208 that includes one or more holes or bores 210. An axle 212 passes through the bores 210 to allow the throttle lever 46f to move, such as pivot, when the operator 20 applies the operator force generally in the direction of arrow 62. Rotation about the axle 212 allows movement of the throttle cable 60 (not illustrated in FIG. 7) or rotational movement sensed by the rotation sensor 51 (not illustrated in FIG. 7) in an electronic throttle controller (ETC).

As the operator 20 applies the operator force $F_o$ generally in the direction of arrow 62, the throttle lever 46f begins to rotate generally also in the direction of arrow 62. The second portion 206, however, will initially move prior to movement of the second portion 200 due to a gap 216 formed between the second portion 206 and the first portion 200 and a hinge portion 218. The hinge portion 218 may be a living hinge or a separate hinge mechanism connecting the first portion 200 and the second portion 206. Movement of the second portion 206 relative to the first portion 200 causes a movement of a first internal projection 220 relative to a second internal projection 224. The first internal projection 220 extends from the first portion 206 and the second projection 224 extends from the first portion 200. Positioned between the two projections 220, 224 is a sensor 230. The sensor 230 may be formed as a sensor pill or body that incorporates an appropriate sensor, such as those discussed above to detect a force or load. The sensor 230 may have leads 232 that extend to selected components, such as the ECU or other components, including those discussed further herein. The sensor 230 senses, for example, force applied to the sensor 230 due to movement of the first projection 220 towards the second projection 224 when the second portion 206 moves relative to the first portion 200.

As discussed above, when pressure is applied, the sensor 230 generates the VS signal that is sent to the ECU indicating the application of the operator force by the operator 20 generally in the direction of arrow 62. The generation of the VS signal from the sensor 230 is evaluated based on a selected logic as discussed below, in order to determine whether the engine should be operated in a normal operation mode or another mode, such as a limp mode.

Figure 8:
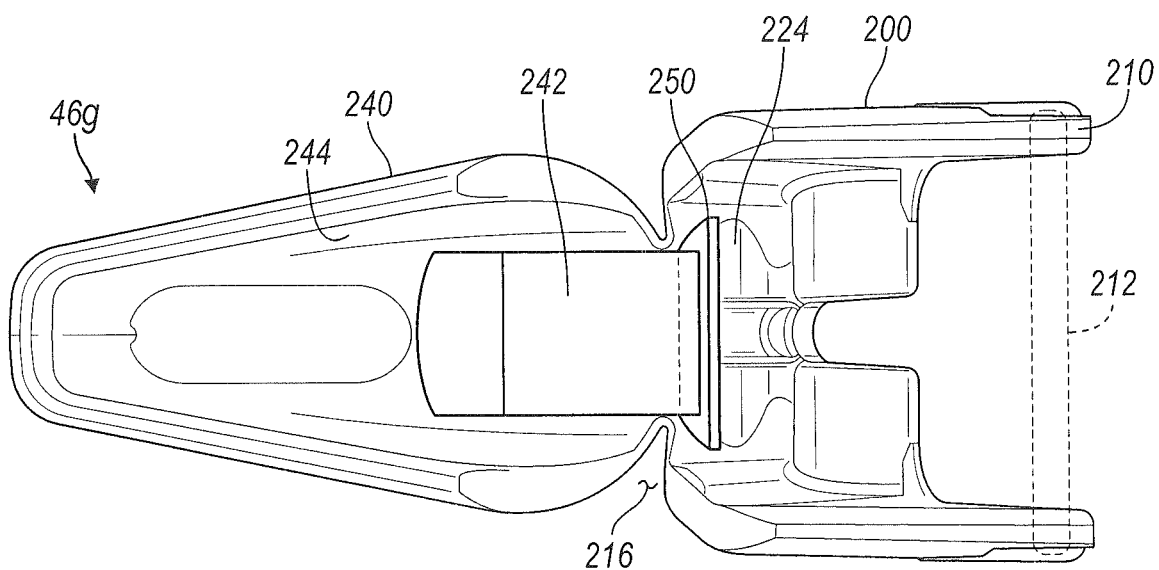
FIG. 8 is a detailed view of a throttle actuator and verification sensor, according to various embodiments.

With reference to FIG. 8, a throttle lever 46g is illustrated. The throttle lever 46g is similar or substantially identical to the throttle lever 46f, save for the differences noted below. For example, the throttle lever 46g includes a first portion 200 that includes one or more axle bores 210 to allow the throttle lever 46g to rotate about the axle 212. Further, the first portion 200 includes the second projection 224. The throttle lever 46g further includes a second portion 240. The second portion 240 includes a sensor arm or portion 242 formed with or fixed to an interior region 244 of the second portion 240.

The sensor arm 242 is moved to contact or moved in proximity relative to a sensor 250. The sensor 250 may be a sensor similar to those discussed above such as a pressure sensor, proximity sensor, or the like. The sensor arm 242 may be moved with the second portion 240 to move relative to and/or to contact the sensor 250. Further, the gap 216 is formed between the first portion 200 and the second portion 240. The second portion 240 may move or flex relative to the first portion 200 when the operator force is applied by the operator 20 generally in the direction of arrow 62 (not illustrated in FIG. 8). The second portion 240 may initially or first move toward the first portion 200 causing the sensor arm 242 to move relative to and/or contact the sensor 250. Therefore, the sensor 250 generates the VS signal based upon the movement of the sensor arm 242 to be transmitted to the ECU, as discussed above.

Figure 9A:
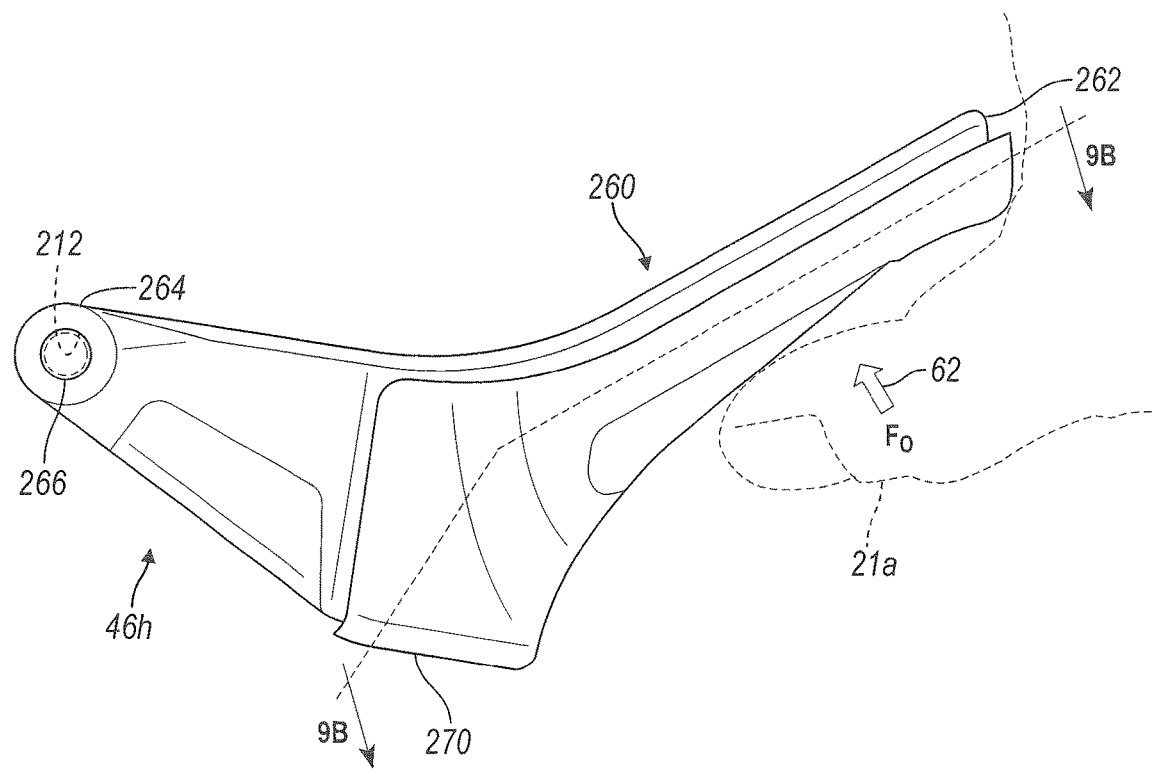
FIG. 9A is a detailed view of a throttle actuator and verification sensor, according to various embodiments.
Figure 9B:
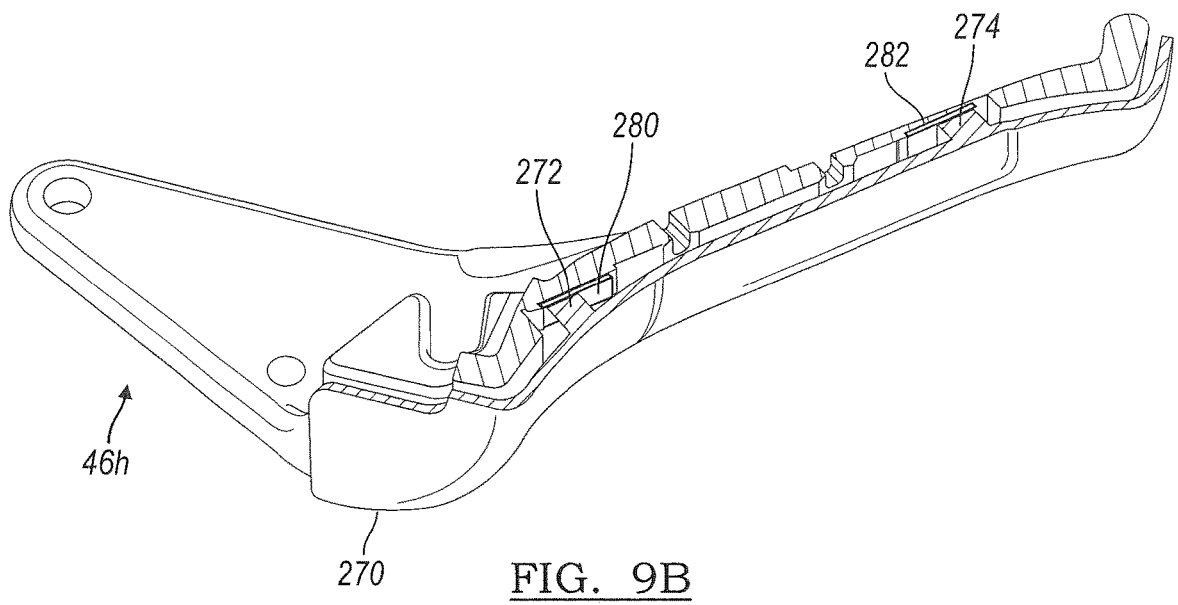
FIG. 9B is a cross-sectional view of the throttle actuator of FIG. 9A.

With reference to FIG. 9A and FIG. 9B, a throttle lever 46h is illustrated. The throttle lever 46h includes a lever arm portion 260. The lever arm portion 260 extends from a first terminal end 262 to a second terminal end 264. At the second terminal end 264 is a bore or depression 266 that engages or receives the axle or pin 212. The throttle lever 46h may be moved in an arc around the axle 212 when the operator 20 applies the operator force generally in the direction of arrow 62. As discussed above, the throttle lever 46h may be operated with a digit, such as the thumb 21a of the operator 20. The operator force applied by the operator 20 generally in the direction of the arrow 62 may cause the throttle lever 46h to rotate around the axle 212 in the direction of the arrow 62.

The application of the operator force by the thumb 21a may be to an exterior portion of the throttle lever 46h, such as an overmold or covering portion or piece 270. The over mold piece 270 may cover at least a portion of the lever arm portion 260 of the throttle lever 46h. The over mold portion 270 (herein referred to as outer member 270) may be movable or flexible relative to the lever arm portion 260. In various embodiments the outer member 270 may further include force transferring or inner projections 272 and 274.

The outer member 270 may cover one or more sensors 280 and 282. The sensors 280, 282 may be any appropriate sensors such as strain gauge sensors, pressure sensors, or the like. Further, it is understood that a plurality of the sensors 280, 282 may be provided along a length of the lever arm portion 260 and covered by the outer member 270. Each of the sensors 280, 282 may be aligned, so as to be contacted by, one or more of the projections 272, 274. Simply including the two sensors 280, 282 is for ease of the current discussion.

The sensors 280, 282 generates the VS signal when the operator 20 touches, presses or pushes against the lever 46h generally in the direction of arrow 62. The sensors 280, 282 generate the VS signal, as discussed above, based upon the application of the lever arm portion by the operator 20. The VS signal generated with the sensors 280, 282 may be related to the TPS signal regarding the sensed position of the throttle to verify the operator's 20 application of the operator force to the throttle lever 46h. The ECU receives the VS signal from the sensors 282, 280 and relates the VS signal to the position of the throttle from the TPS to determine the appropriate mode of operation for the motor. It is understood that other appropriate sensors may be connected to the lever portion 262, such as a strain gauge. The overmold portion 270 may or may not be necessary over a strain gauge, or any appropriate gauge to be contacted by the user 20, such as by the digit 21a.

Returning reference to FIG. 1A, a position or proximity sensor assembly may be provided between the operator 20 and the snowmobile 10. In addition to a sensor configured and operable to verify the application of the operator force to the throttle lever 46, a verification system may be provided to verify the position of the operator 20 relative to the snowmobile 10. For example, the operator position verification system may include a sensor, such as a proximity sensor of the operator 20 relative to the snowmobile 10. In various embodiments, a first sensing portion 300 may be positioned or formed with the snowmobile 10, such as within the seat 22. A second sensor portion 310 may be integrated or attached to a portion of the operator 20, such as a sensor portion 310 positioned in a pocket of a jacket of the operator 20.

At a first selected or predetermined distance between the first sensor portion 300 on the snowmobile 10 and the second sensor portion 310 with the operator 20, the engine of the snowmobile 10 may operate in a normal mode. At a second distance, such as a distance greater than the first predetermined distance, the first sensor portion 300 may send an error or non-verification signal to the ECU to change the operational mode of the engine. In various embodiments, a weight or pressure sensor may be incorporated into the seat 22 to sense a weight of the operator 20 on the seat 22 to send a proper rider proximity signal. Accordingly, a proximity of the operator 20 relative to the snowmobile 10 may also be required for normal operation of the snowmobile 10.

As discussed above, if the operator 20 is not near (e.g. positioned on the seat 22 of the snowmobile 10) the snowmobile 10, a non-proximity signal may be sent, and then the engine may be placed into a limp or stop mode. In various embodiments, the operator 20, including the second sensor portion 310, is required to be near or in contact with the snowmobile 10 for normal operation of the engine. In this manner, the position of the operator 20 relative to the snowmobile 10 is also be used as a verification system, and/or to supplement other verification systems (e.g. the VS signal sent form the sensor at the throttle lever as discussed above), to provide a verification signal to the ECU for operation of the engine. Therefore, the ECU may compare the signal from the operator position verification system to the throttle position sensed by the TPS to confirm that the throttle should be an open or high throttle position. If the operator 20 is not in an appropriate location relative to the snowmobile 10, the ECU may change an operational mode of the engine based upon the lack of a verification signal.

Turning to FIG. 10A, a schematic illustration of the throttle lever 46 including at least one of the verification or operator force sensors is shown. As discussed above, the operator force sensors are part of the verification system. The digit 21a of the operator 20 may contact the throttle lever 46 to actuate (e.g. move) the throttle lever. Movement of the throttle lever 46 causes a throttle body 350 in an engine 354 to increase throttle. As is generally understood in the art, the throttle body 350 may include a valve, such as the butterfly valve. As the butterfly valve opens a greater amount of an air/fuel mixture may enter the engine 354 to allow a greater combustion of fuel in the engine 354.

The position of the valve, such as the butterfly valve, in the throttle body 350 may be sensed by a TPS 358. The TPS 358 sends a signal to the ECU 362. Under normal or a first operating condition, the ECU 362 controls various other inputs to or conditions of the engine 354 such as fuel, spark, and the like. Under normal operating conditions, the more open the throttle valve in the throttle body 350, the higher rotations per minute (RPM) the engine will operate and the greater speed of the snowmobile 10. Under various other conditions, however, the ECU 362 may be programmed to operate the engine 354 in a non-normal, such as a governed or controlled, manner. For example, the ECU 362 may cut fuel, stop spark, or other operational parameters of the engine 354 may be limited if the ECU 362 determines that the engine 354 should not operate in a normal manner.

The throttle lever 46 includes one or more sensors, such as the sensor 70b. As discussed above the sensor 70b may be incorporated into a verification system that is on or incorporated with the throttle lever 46 or relative to the throttle lever 46. It is understood, however, that more than one sensor may be included. The sensor 70b transmits a signal to the ECU 362 regarding the sensed feature, such as the operator force on the throttle lever 46.

In various embodiments, the verification system includes a processor 370 as a part of the verification system, such as co-located with the sensor 70b or any appropriate sensor, at the throttle lever 46 or near the throttle lever 46. The processor 370 may be any appropriate processor such as a micro-processor including the PIC18LF26K80-I/SS or PIC18LF26k80-I/MM, both sold by Microchip Technology, Inc. having a place of business at Chandler, Ariz. The processor 370 receives a signal from the sensor 70b and allow for local processing of the VS signal from the sensor 70b. The processor 370 can send a predetermined digital signal to the ECU 362 along a signal line 374. The signal from the processor 370 to the ECU 362 need not be further processed at the ECU 362 other than to determine whether the signal sent from the processor 370 is the signal to allow normal operation of engine 354. The processor 370 may also be provided with power through a power connection 376 and may further include a ground connection 378. Various other sensors may also be provided at the throttle lever 46, such as a temperature sensor 382 to determine an environmental temperature at or near the processor 370.

The sensor 70b may also provide a signal directly to the ECU 362. Thus, the processor 370 is not required. Further, the VS signal to the ECU 362 may be any appropriate signal, such as an analog or a digital signal. If an analog signal is sent directly to the ECU 362, it may be received at an analog input and be converted to a digital signal with an appropriate A/D converter. Regardless of the type of signal, as discussed herein, the ECU 362 may act as a determination system, such as an AND gate, to determine engine operation based on the single from the sensor 70b to the signal from the TPS 358.

In various embodiments, the sensor 70b and/or the processor 370 may operate optimally in a selected environmental condition, which may be outside the range of environmental conditions experienced by the snowmobile 10 or other vehicle system. Accordingly, a temperature sensor 382 senses a temperature at or near the processor 370 and transmit the temperature to the processor 370. The processor 370 can send a signal to a heating system 390 along a signal line 394. The signal may go first to a vehicle power 396 that powers a heating element for the verification system 402.

The verification system heating element 402 may be provided with a power line 404 from the vehicle power and a ground 406. The vehicle power 396 may also power a heating element for the throttle lever 46, such as to provide heat to the digit 21a. For example, a low power heating element 410 and a high power heating element 412 may be provided. The respective heating elements may have a low power line 414 and a high power line 416 to power the respective heating elements. In this way, the high and low power heating elements 410, 412 provide a selected temperature for the digit 21a and the verification system heating element 402 may provide heat for an optimal temperature operational range for the processor 370 and/or the sensor 70b. Generally, the high power heating element 412 may be powered to generate a local temperature of about 90° C. to about 120° C., including about 100° C. to about 110° C., and further about 105° C. The low power heating element may be powered to generate a local temperature of about 50° C. to about 60° C.

As also discussed above, the verification system may have an optional rider present (e.g. proximity) sensor 300. The rider present sensor 300 may also transmit a signal to the ECU 362. The ECU 362 may then generate a signal for operation of the engine 354 that is based on the signal from the rider present sensor 300 and/or the operator force sensor and the TPS signal from the TPS 358.

In addition, the throttle lever 46 may be connected directly (e.g. with a cable) to the throttle body 350 and/or with the ETC, as discussed above. The connection for the ETC may be through a throttle communication line 430 to the ECU 362 and a communication line 432 to the engine 354 (including the throttle body 350). Thus, the throttle lever 46 may be operated to change the throttle and speed of the engine 354.

In various embodiments, a throttle actuator 546 may be provided, as illustrated in FIG. 10B. The throttle lever 546 is substantially similar to the throttle lever 46 illustrated in FIG. 10A, and the same reference numbers are used for the same components. The throttle lever 546 includes a first power switch 550 and a second power switch 556. The power switches 550 and 556 may be switched with the processor 370 to power on the respective heating elements, including the heating element 402 for the verification system and the heating elements 410, 412 for the thumb heater. This configuration may allow for efficient communication and control of the various heating elements, and reduce components. It is understood that any appropriate components may be provided to operate the selected heating elements. Moreover, more than one sensor 70b is provided, including sensor 70'b, and 70"b. The sensors 70b, 70'b, and 70"b may be redundant or different types of sensors. In operation, however, the multiple sensors provide the VS signal to the ECU 362, as discussed above.

In various embodiments, a throttle actuator 646 may be provided, as illustrated in FIG. 10C. The throttle lever 646 is similar to the throttle lever 46 illustrated in FIG. 10A, and the same reference numbers are used for the same components. The throttle lever 646 may include the more than one sensor 70b, including sensor 70'b, and 70"b. The sensors 70b, 70'b, and 70"b may be redundant or different types of sensors. In operation, however, the multiple sensors provide the VS signal to the ECU 362, as discussed above.

One or more of the sensors 70b, 70'b, and 70"b sends the appropriate signal to the processor 370, including the VS signal if proper, as discussed above. The processor 370 communicates with the ECU 362 via a controller area network (CAN), including a CAN high 660 and a CAN low 664, communication link. Other appropriate communication links or connections may also be provided that are redundant or alternative to the CAN communication, including a direct link form the sensors 70*b*, 70'*b*, and 70"*b* or other appropriate serial communication. The ECU 362 operates the engine 354 (FIG. 10A) as discussed above based at least on the signal from the sensors 70*b*, 70'*b*, and 70"*b*.

The processor 370 is further configured, such as by executing instructions stored on a memory (e.g. a memory incorporated with the processor 370) to operate switches for the various heating elements. The first power switch 550 may be operated based on feedback from the heating element 402, which may include a temperature sensor, to power or not power the heating element 402. The second switch 556 may be operated based on feedback from the heating element 410, 412, which may include a temperature sensor, to power or not power the heating element 410, 412. A third switch 556' may be operated based on feedback from the heating element 680, which may include a temperature sensor, to power or not power the heating element 680. A fourth switch 556" may be operated based on feedback from the heating element 684, which may include a temperature sensor, to power or not power the heating element 684. The heating elements 680, 684 may be provided at selected locations, such as in the handlebar grip 50 to warm the hand 21 of the operator 20.

The engine 354 may, therefore, be operated based upon a selected logic including inputs from the various sensors. The various sensors may include one or more sensors in the throttle actuation verification system that sends the VS signal. The various sensors may also include one or more rider present (also referred to as tether system) sensors 300. A signal from one or both of these systems is sent to the ECU 362. The ECU 362 also receives a TPS signal. The ECU 362, or other appropriate control module, according to the logic discussed herein, then controls and/or places the engine 354 in a selected mode based on a signal (e.g. high signal) from one or more of the TAVS and/or the rider present and a TPS signal. A temperature sensor associated with any one of the systems, including the TPS, the TAVS, or the rider present system, may also generate a signal that is used to adjust the output parameters of the respective systems. For example, a TAVS signal may be amplified by a selected amount if the sensed temperature is outside a selected range.

According to various embodiments, the control logic may include if a TPS signal from the TPS 358 is greater than an idle TPS percent (e.g. 7%) and a verification and/or rider (or operator) present signal is received (e.g. from the sensor 70*b* and/or the ride or present sensor 300), a determination (e.g. by comparing and/or using an AND gate at least one of the sensor signals to the TPS signal at the ECU 362) that the rider is present and intending to increase and/or have a throttle greater than a selected amount (e.g. 7%) the throttle amount may be made and/or maintained and normal engine operation may be allowed by the ECU 362. It is understood that the ECU 362 may be programmed to require a signal (e.g. high signal) from both the VS and the rider present sensor, or only one. If the TPS signal is greater than the idle TPS percent and there is no verification signal from either or both of the sensor 70*b* or the rider present sensor 300 (e.g. by comparing and/or using an AND gate at least one of the sensor signals to the TPS signal at the ECU 362), the ECU 362 may determine that the rider is not present and the engine 354 may be shut down, as discussed above by limiting or cutting fuel, spark, providing an engine error code, or other engine parameter. Further, if any of the signals from the verification system and/or the rider present system are invalid, the ECU 362 may determine to operate the engine in a limited engine performance, such as a limp mode allowing only a maximum engine speed or RPM.

As discussed above, various sensors may be provided in the throttle lever 46. The sensors may sense at least a contact or engagement of the operator with the throttle lever 46. The contact may further include an application of enough force to cause an initial flexion, deflection, strain, or the like of the operator 20 to the throttle lever 46. The initial application of force may be applied and be sensed by the selected sensor prior to overcoming the throttle cable force 66 (understood to be overcome to increase the throttle whether or not a throttle cable is physically present). Therefore, the sensors at the throttle lever 46 may be used to verify that the sensed position of the throttle, such as with the TPS 358, is proper and valid. As discussed above, the logic instructions may then be followed to determine whether the engine 354 should be controlled in a normal or limited manner by the ECU 362. The sensors may further include a rider present sensor 300 that may be a further signal to the ECU 362 to which the logic is applied. It is further understood, the ECU 362 may be any appropriate control module and need not be the ECU 362. The control module receiving the VS signal may then operate the engine 354 and/or communicate with the ECU 362 to operate the engine 354.

The sensors at the throttle level 46 may be provided in an appropriate manner, such as connected to a surface thereof or incorporated—encapsulated into the throttle lever 46, as discussed above. Further, the sensors are generally encapsulated relative to the exterior environment to assist in resisting or ensuring no degradation of the sensor or operation of the sensor during the use of the snowmobile 10. Further, as discussed above, the environment near the sensor may be augmented with one or more heating elements to assist in ensuring proper application or sensing. The various sensors discussed above are also not exclusive to the embodiments in which they are illustrated, but may be placed in other embodiments alone or with other sensors. Regardless, the sensors may be verification sensors for verifying a contact or presence of the operator and to actuate the throttle lever.

Accordingly, the ECU 362 may include the logic scheme, as discussed above, to determine the proper mode of operation of the engine 354. The mode of operation of the engine 354 may be based upon both a signal from the TPS 358 and a signal from at least one of a rider present sensor 300 or a sensor at the throttle lever 46. Either or both of the signals may be applied by the ECU 362 to the TPS signal from the TPS 358 to determine proper operation or a selected operation of the engine 354. Accordingly, the ECU 362 may assist in ensuring a selected operation of the engine 354 based upon an actual intention and/or presence of the operator 20.

The signals from the sensors to the ECU may be any appropriate signal type. For example, a digital or an analogue signal may be sent to the ECU. Further, the signal may be a pulse width modulated signal or other appropriate signal type. Moreover, the signal may be transmitted via an appropriate communication link, such as a wireless or a wired communication link.

As discussed above, the TAVS may include one or more sensors, such as the sensor 70 or other sensor assembly as illustrated in various embodiments discussed above. It is understood that the various embodiments may include portions that can be combined together to form or form portions of the TAVS system, according to various embodiments, and may eliminate various portions of other embodiments. Accordingly, it is understood that the various embodiments are not mutually exclusive unless specifically stated so. Moreover, it is understood that various alternatives and/or additions may be made to the embodiments as discussed above.

Figure 11A:
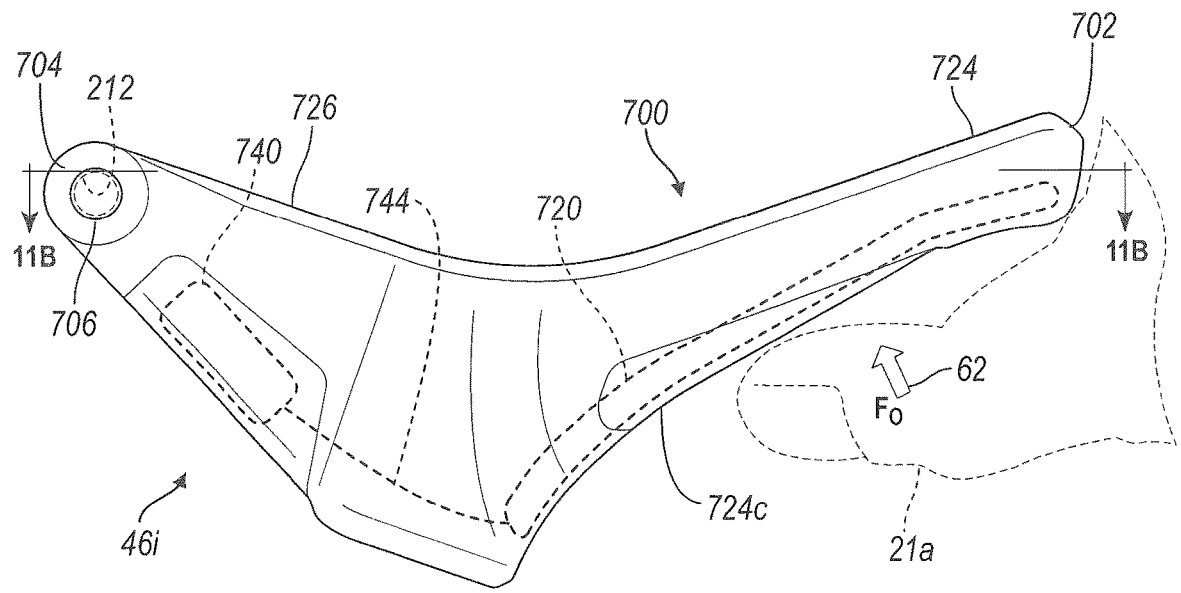
FIG. 11A is a detailed view of a throttle actuator and verification sensor, according to various embodiments.
Figure 11B:
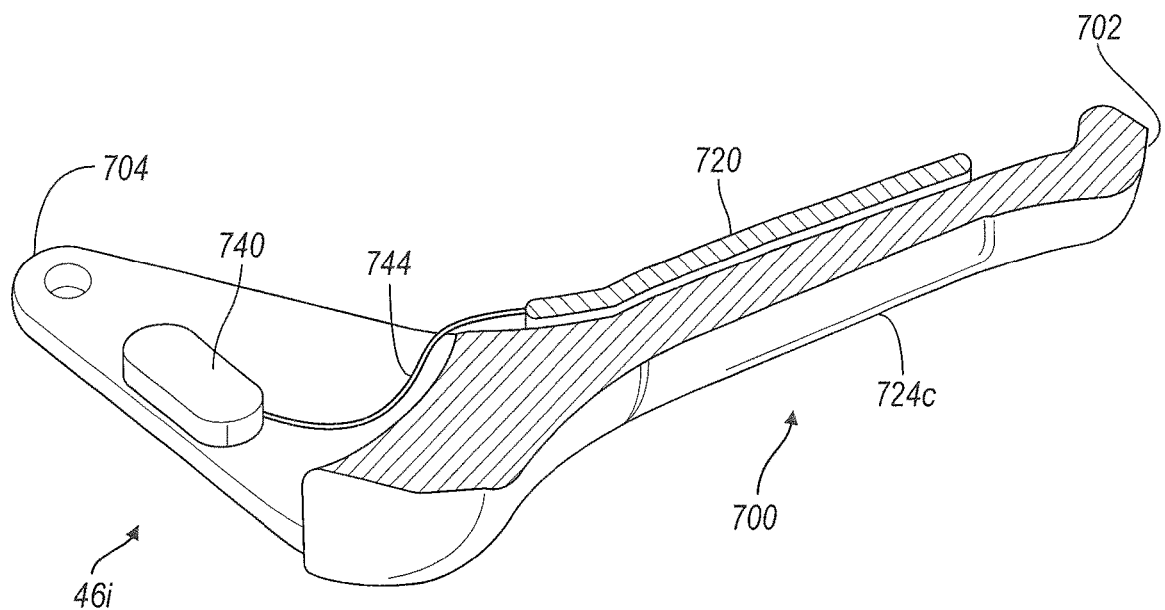
FIG. 11B is a cross-sectional view of the throttle actuator of FIG. 11A.

With reference to FIG. 11A and FIG. 11B, a throttle lever 46i is illustrated that includes a substantially unitary lever portion 700 that extends from a first terminal end 702 to a second terminal end 704. The throttle lever 46i may be similar to the throttle levers, as discussed above, to operate a throttle or speed control of the snowmobile 10 by the operator 20. As illustrated in FIG. 11A, the operator 20 may actuate or move the lever 46i by directing a force or applying a force with a digit, such as the thumb 21a, generally in the direction of arrow 62 to move the lever portion 700 in a similar direction. The throttle lever 46i may, therefore, rotate or be moved around the axle or pin 212 within a bore or depression 706 at or near the terminal end 704. It is understood that the lever portion 700 may be formed in any appropriate manner, and is illustrated to include an angle portion or an angle a non-linear body, merely as an example.

As discussed above, the lever 46i may include one or more sensors to sense an actuation of the lever 46i or position of the thumb 21a relative to the lever portion 700. In various embodiments, the lever 46i may include one or more sensors such as a sensor package or assembly 720. The sensor 720 may be a touch sensitive sensor that may sense the presence of the thumb 21a and/or the pressure applied generally in the direction of arrow 62. In various embodiments, for example, the sensor 720 may be a capacitive touch sensor. Touch sensors may include sensors such as a touch sensitive or touch indication system including the AlSentis® HSS™ Touch Buttons or inputs including those integrated with a Door Handle sold by AlSentis LLC., having a place of business in Holland, Mich. It is understood, however, that any appropriate touch sensitive or touch indicative sensor may be used.

As discussed above, the lever 700 may extend from a first terminal end 702 to the second terminal end 704. The lever 700, however, may include various portions, such as a first lever portion 724. The first lever portion 724 may be formed in a substantially unitary manner (e.g. injection molding, blow molding, or the like) of a selected and appropriate material with a second portion 726. Each of the portions 724, 726 may be formed as a single piece and may have integrated therewith, attached thereto, or combinations thereof, the sensor 720.

As illustrated in FIG. 11A, the thumb 21a may touch the lever portion 724, such as on an exterior surface 724c. The exterior surface 724c may be a touch or control surface to be contacted by the thumb 21a to operate or move the throttle lever 46i. As it is understood by one skilled in the art, the operator 20 of the snowmobile 10 may wear gloves or other insulated devices such that direct skin contact with the lever 700 does not occur. However, the touch sensor 720 may still sense the presence of the thumb 21a on or applying force to the lever 700. Accordingly, the operator 20 may apply the force with the thumb 21a and the touch sensor 720 may sense the touch of the thumb 21a, even if direct contact is not made. It is understood, for example, that the VS signal verifying presence of the thumb 21a, or other selected digit or portion for operation of the throttle lever 46i, may be set at a selected distance from the sensor assembly 720. For example, the distance may be about 0 centimeters (cm) (i.e. direct contact) to about 30 cm, including about 0.5 millimeters (mm) to about 10 mm. Moreover, contact with the thumb 21a with the lever 700 may not substantially deform or change the shape of the lever portion 700 while still allowing the sensor 720 to sense contact of the thumb 21a with the lever 700.

Accordingly, the sensor 720 may act as the VS sensor of the TAVS system, as discussed above, similar to the sensors including the sensors 70b, as discussed above and illustrated in FIG. 10A, FIG. 10B, and FIG. 10C. In various embodiments, the sensor or sensor assembly 720 may include all or a majority of the portions illustrated in the figures as discussed above, including FIG. 10A, FIG. 10B, and FIG. 10C. For example, the sensor assembly 720 may include the sensor portion, such as those discussed above, a processor, such as the processor 370, discussed above, various other sensors (e.g. a temperature sensor such as the temperature sensor 382), and various heating elements (e.g. the TAVS heating element 402 and the lever heating elements, such as the low and high heating elements 410, 412). The sensor assembly 720 may also include various portions that will offer transmission of the sensor signal to various components, such as the ECU 362 discussed above. The operation of the sensor assembly 720, therefore, may operate in conjunction, or as described above.

In various embodiments, the sensor portions of the sensor assembly 720 may be integrated on a selected layer which may be separate from other portions, such as the temperature sensors and/or and the heating elements 410, 412. The processor system 370 may also be placed on a same or different layer from the sensors and/or the heating elements. Thus, it is understood, that the various portions discussed above may be integrated into a single sensor assembly 720 in various layers and/or separated.

It is further understood that the processor 370 may operate to process the signal received from the sensors and output the signal to the ECU 362 regarding the verification of position of the thumb 21a on the throttle for operation of the throttle body 350, as discussed above. In addition, or as an alternative thereto, the sensor 720 may operate to transmit the sensed signal rather than a processed signal, processed with the processor 370, where the processor 370 may only process the input from the sensor and transmit the input from the sensor rather than executing any logic based upon input from a sensor.

In various embodiments, however, various components may be further separated from one another. For example, the sensor assembly 720 may include only one or more sensor buttons or portions that sense the presence or force applied by the thumb 21a. In addition to the sensors, however, it is understood that a heating element, such as the TAVS heating element 402 may also be present on the sensor assembly 720. Further the thumb heating elements 410, 412 may also be present or formed with the sensor assembly 720. In various embodiments, however, one or more of the heating elements may be separated and/or the processor assembly, including the processor 370 may be positioned separate or spaced apart from the sensor assembly 720.

For example, a processor assembly 740 may be positioned away from the sensor assembly 720. A connection, such as an electrical connection 744, may be provided to interconnect the sensor assembly 720 and the processor assembly 740. The separation of the processor assembly 740 from the sensor assembly 700 may allow for positioning of the processor 370 at any appropriate location, separate from the sensor assembly 720 positioned on or at the throttle lever 46i. Accordingly, although exemplary illustrated within the throttle lever assembly 46i, the processor assembly 740 may be positioned at any appropriate location, such as a remote from the throttle lever 46i. In various embodiments, the processor assembly 740 may be integrated with the ECU 362, or positioned at a separate location on the snowmobile 10. Regardless, this may allow for efficient repair of one or both components, such as replacement of the sensor assembly 720 in case of damage thereto, and/or replacement of the processor assembly 740 for example in case of an upgrade.

Accordingly, as discussed above, the sensor assembly 720 may include substantially touch sensitive or conformation separate from requiring direct contact with skin or other capacitive change or reducing portion and/or direct force or sensed force applied by the thumb 21a. The sensor assembly 720 may sense touch or presence of the thumb 21a spaced apart from the sensor assembly 720 and generally through instructions, such as clothing, gloves, material of the lever assembly 46i, or other substances.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A throttle verification system, comprising:
   a throttle actuator rotatable about a first pivot point the throttle actuator having a first portion and a second portion with a living hinge region between the first portion and the second portion such that the second portion can move relative to the first portion at a second pivot point at the living hinge region;
   a verification system (VS) sensor positioned to sense at least movement of the first portion relative to the second portion at the second pivot point based upon a contact of an operator applied to the throttle actuator; and
   a module to receive a verification signal from the VS sensor and a second signal;
   wherein the module can verify a desired operation of a vehicle.

2. The system of claim 1, wherein the throttle actuator includes a an overmold portion with the VS sensor between the throttle actuator and the overmold portion.

3. The system of claim 1, wherein the VS sensor includes at least one of a pressure sensor, a strain sensor, a Hall Effect sensor, or capacitive touch sensor.

4. The system of claim 3, wherein the VS sensor is configured to sense contact of a digit.

5. The system of claim 3, wherein the VS sensor is imbedded into the throttle actuator.

6. The system of claim 5, wherein a force applied to the throttle actuator is sensed with the VS sensor.

7. The system of claim 1, wherein the module includes an engine control unit.

8. The system of claim 7, further comprising:
   a throttle position sensor;
   wherein the verification signal and a throttle position sensor signal are evaluated by the module to confirm the desired operation of the vehicle.

9. The system of claim 1, wherein the throttle actuator includes a throttle lever having the first portion and the second portion;
   wherein the VS sensor senses movement of the throttle lever.

10. A throttle verification system, comprising:
    a throttle actuator;
    a throttle lever position sensor that senses a position of the throttle actuator;
    a verification system (VS) sensor assembly connected to the throttle actuator positioned to sense at least a presence of an operator contacting the throttle actuator;
    a transmitter to transmit a verification signal from the VS sensor assembly; and
    a module to receive the verification signal from the VS sensor assembly and a throttle position signal from the throttle lever position sensor;
    wherein the module can verify a desired operation of a vehicle.

11. The system claim of claim 10, wherein the module further receives a third signal.

12. The system of claim 10, wherein the throttle actuator is formed as a single member;
    wherein the VS sensor assembly is connected to a first side of the single member and the operator contacts a second side of the single member.

13. The system of claim 10, wherein the VS sensor assembly includes a capacitive sensor operable to sense the operator contact.

14. The system of claim 13, further comprising:
    a heating element operable to generate a local temperature of about 90° C. to about 110° C.

15. The system of claim 10, further comprising:
    a throttle position sensor;
    wherein the verification signal and a throttle position sensor signal are evaluated by the module.

16. The system of claim 10, wherein the VS sensor assembly is imbedded into the throttle actuator.

17. The system of claim 16, further comprising:
    a processor system operable to process a sensor signal from a sensor of the VS sensor assembly and generate the verification signal.

18. The system of claim 17, wherein the VS sensor assembly includes the processor system.

19. A method to verify a throttle activation of a vehicle, comprising:
    sensing with a verification system (VS) sensor assembly at least a presence of operator contact on a throttle actuator;
    transmitting a verification signal from the VS sensor assembly when at least the presence of the operator is sensed on the throttle actuator; and
    receiving the verification signal at a module to verify a desired operation of a throttle of the vehicle.

20. The method of claim 19, further comprising:
    generating a throttle position signal with a throttle position sensor; and
    evaluating together both the verification signal and the throttle position sensor signal to operate a throttle body of the vehicle.

21. The method of claim 20, wherein the VS sensor assembly includes a capacitive sensor operable to sense the operator contact.

22. The method of claim 19, further comprising:
heating at least a portion of the throttle actuator with a heating element to a temperature of about 90° C. to about 110° C.

23. The method of claim 19, further comprising sensing with a throttle lever position sensor a position of the throttle actuator; and
receiving a throttle position signal from the throttle lever position sensor at the module to verify the desired operation of the throttle of the vehicle.

\* \* \* \* \*